US006254426B1

(12) United States Patent
Iacovelli et al.

(10) Patent No.: US 6,254,426 B1
(45) Date of Patent: Jul. 3, 2001

(54) JUMPER CABLES

(75) Inventors: Marc Iacovelli; Saied Hussaini, both of Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 0 days.

(21) Appl. No.: 09/239,674

(22) Filed: Jan. 29, 1999

(51) Int. Cl.[7] .................................................. H01R 11/00
(52) U.S. Cl. ........................ 439/504; 439/490; 439/754; 320/105
(58) Field of Search .................................. 439/503, 504, 439/490, 754; 320/105

(56) References Cited

U.S. PATENT DOCUMENTS

| | | | |
|---|---|---|---|
| 3,259,754 | 7/1966 | Matheson | 307/85 |
| 3,267,452 | 8/1966 | Wolf | 324/437 |
| 4,145,648 | 3/1979 | Zender | 320/105 |
| 4,163,134 | 7/1979 | Budrose | 200/157 |
| 4,166,241 | 8/1979 | Grant | 320/105 |
| 4,272,142 | 6/1981 | Zapf | 939/504 |
| 4,286,172 | 8/1981 | Millonzi et al. | 307/10 R |
| 4,349,774 | 9/1982 | Farque | 320/105 |
| 4,420,212 | 12/1983 | Wright | 439/490 |
| 4,447,785 | 5/1984 | Wright | 320/105 |
| 4,488,147 | 12/1984 | Signorile | 340/636 |
| 4,607,209 | 8/1986 | Guim et al. | 320/105 |
| 4,769,586 | 9/1988 | Kazmierowicz | 320/105 |
| 4,840,583 | 6/1989 | Moore | 439/504 |
| 4,869,688 | 9/1989 | Merio | 439/141 |
| 4,897,044 | 1/1990 | Rood | 439/504 |
| 4,938,712 | 7/1990 | Black | 439/490 |
| 4,969,834 | 11/1990 | Johnson | 439/141 |
| 5,230,637 | 7/1993 | Weber | 439/504 |
| 5,367,243 | 11/1994 | Wells et al. | 320/105 |
| 5,371,455 | 12/1994 | Chen | 320/105 |
| 5,635,817 | 6/1997 | Shiska | 320/105 |
| 5,790,037 | 8/1998 | Walblay | 340/636 |
| 5,795,182 | 8/1998 | Jacob | 439/504 |

Primary Examiner—T. C. Patel
(74) Attorney, Agent, or Firm—Liniak, Berenato, Longacre & White

(57) ABSTRACT

A battery jumper cable having a light source which may be activated independently from a connection with a battery to be charged. At least one of the jumper cable connectors includes a voltage source, a switch and a light. Simple activation of the switch will cause the voltage source to illuminate the light thus providing sufficient lighting to identify the polarity of battery posts and establish a proper connection between the connector and battery terminal. In an alternate embodiment, the voltage source is provided from an external booster battery. An electrical connection is established between opposite cables. The switch closes a circuit between the external booster battery and the light thereby providing voltage to the light. The connector may be used as a flashlight to illuminate a connection area without the need for contact with the battery to be charged.

6 Claims, 4 Drawing Sheets

JUMPER CABLES

BACKGROUND OF THE INVENTION

1. Field of the Invention

This invention is directed to a pair of jumper cables and particularly is directed to a pair of jumper cables having an illuminator with an independent power source to selectively activate the illuminator prior to connection to the battery to be charged.

2. Description of the Prior Art

The use of battery cables is well known in the art. As may be appreciated, these devices are potentially hazardous in the creation of arcing at battery terminals. It is, therefore, important that the jumper cables are connected to the proper battery terminal to ensure safety and eliminate short circuiting the power source. Numerous attempts have been made to develop jumper cable indicating systems that effectively indicate proper batter connection. Many of these types of systems utilize LEDs, or other illuminators, which illuminate when the cables are properly connected. U.S. Pat. Nos. 4,938,712; 4,869,688; and 4,840,583; each disclose such a system and are incorporated herein by reference. However, each of these systems requires a connection to the lesser charged battery to be boosted before indication.

Often, jumper cables must be connected when it is dark, or otherwise poorly lighted. Darkness makes it difficult to see the battery posts and ensure that the jumper cables connectors are properly secured to the terminals. Furthermore, it is very difficult to identify the polarity of the battery terminals and jumper cable connections in the dark.

U.S. Pat. No. 5,367,243 discloses a retractable jumper cable attachment comprising a flashlight and is incorporated herein by reference. A conventional flashlight is connected to both the positive and negative jumper cables. The connection is such that a switch enables the flashlight to be powered either by the battery to which the jumper cable is attached or to batteries contained in the flashlight in the traditional manner.

It is the object of the present invention to improve on the jumper cable systems of the prior art. Specifically, it is the object of the present invention to incorporate a light source within the jumper cable connector that may be selectively activated prior to connection to the battery in need of boosting.

SUMMARY OF THE INVENTION

The present invention is directed to battery jumper cables having a light source capable of independently illuminating a connection to the battery posts of a battery to be boosted prior to that connection. In the preferred embodiment, at least one of jumper cable connector contains a voltage source, a switch, and a light that may used in a similar manner as a conventional flashlight to illuminate a battery post area. In another embodiment, the connector contains a switch, and a light. In this embodiment an additional wire is connected to the switch and the jumper cable of opposite polarity. When the switch is depressed, voltage is supplied to the light from the booster battery with or without connection to the lesser charged battery.

BRIEF DESCRIPTION OF THE INVENTION

FIG. 1. Is a perspective view of a jumper cable connector of a jumper cable of the preferred embodiment of the present invention.

DESCRIPTION OF THE PREFERRED EMBODIMENT

Figure 1:
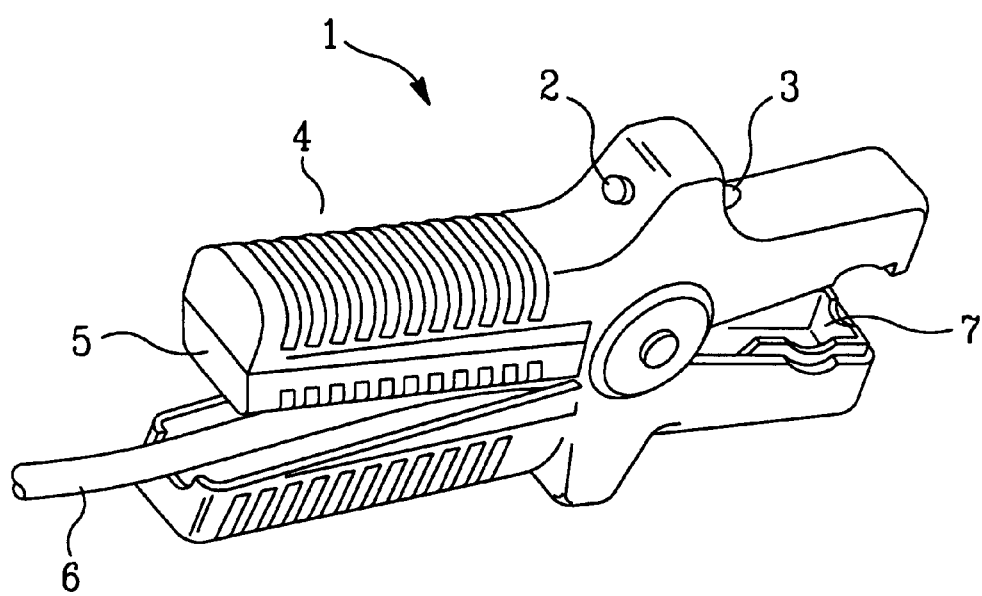

FIG. 1 represents the cable connector 1, (or more commonly known as pole pliers) of the jumper cable of the preferred embodiment. A pushbutton switch 2 is disposed on an assessable portion of the connector. A light 3, preferably an LED, is also disposed on the connector to provide light when connecting to a battery terminal post. A rear portion 4 of the cable connector 1 contains a battery compartment 5 for containing a battery, or batteries, for providing voltage to the light 3.

Conductor cable 6 is connected to the clamp contact member 7 in the conventional manner. The arrangement and operation of the connector 1, (pole pliers) with respect to connection to a battery post and conductor cable is conventional.

Figure 2:
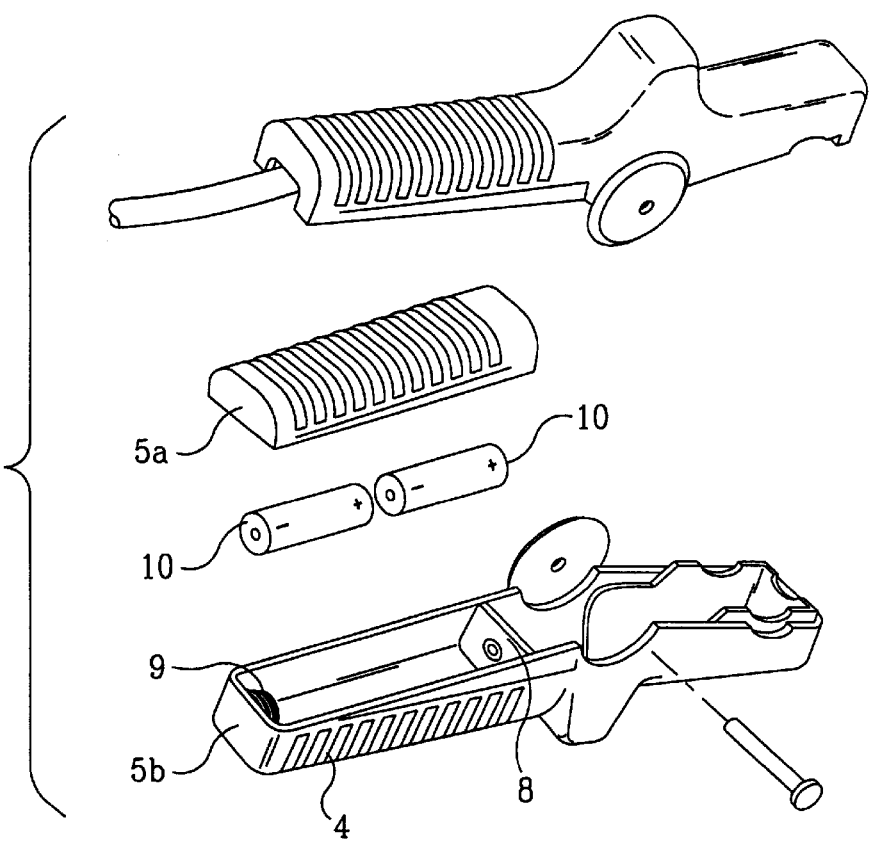
FIG. 2 is an exploded perspective view of the jumper cable connector of FIG. 1.

FIG. 2 represents an exploded view of the jumper cable connector of FIG. 1. The battery compartment 5 comprises a hollowed portion 5b of the rear portion 4 of the connector 1. The hollowed portion 5b contains leads 8 and 9, which in turn are, connected to the switch 2 and light 3. The battery compartment 5 is sized to accommodate batteries 10 to provide the voltage source necessary to illuminate light 3. Preferably the battery compartment is sized to accommodate two AA sized batteries. However, other size batteries, or a single battery, may be employed. FIG. 2 depicts two batteries longitudinally connected in series. However, the specific orientation of the batteries is not important. The batteries may be position juxtaposed one another to facilitate an ergonomic handle portion of the connector. A cap 5a is provided to contain the batteries 10 within the hollowed portion of the connector 5b. The cap 5a may be connected to the hollowed portion 5b of the connector in any workable fashion and is preferably secured thereto in a snap-fit fashion.

Figure 3:
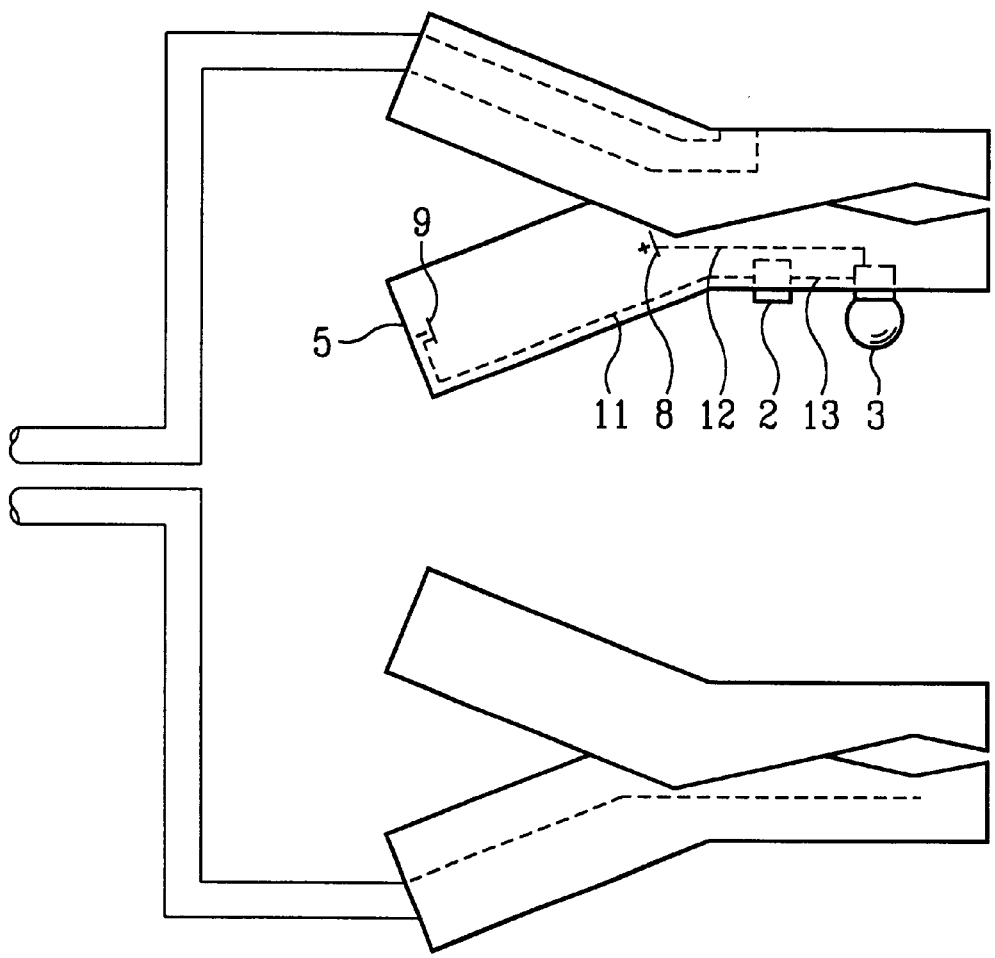
FIG. 3 is a diagram of the wiring of the jumper cable of the preferred embodiment of the present invention.

FIG. 3 represents the wiring of the jumper cable connector (pole pliers) of FIGS. 1–2. A switch is connected to one of the leads 8 or 9 via connection 11. The light is connected to the other lead via connection 12. The switch and light are connected via connection 13. When batteries are inserted in the compartment 5, leads 8 and 9 are thereby connected providing a voltage source to the circuit. Activation of the switch 2 causes the voltage source to illuminate light 3.

The switch 2 is preferably a pushbutton spring activated switch. The switch 2 maintains an open circuit between connections 11 and 13. Depression of the switch closes the circuit between connections 11 and 13 thereby completing the circuit and illuminating light 3. Such an arrangement inhibits the possibility of inadvertently leaving the switch on and depleting the voltage source when not in use. However, other types of switches may similarly be employed.

The light 3 is preferably an LED. However, other types of lights may be employed which provide enough light to identify the polarity of the battery terminals and promote a proper connection without the need of large voltage.

Figure 4:
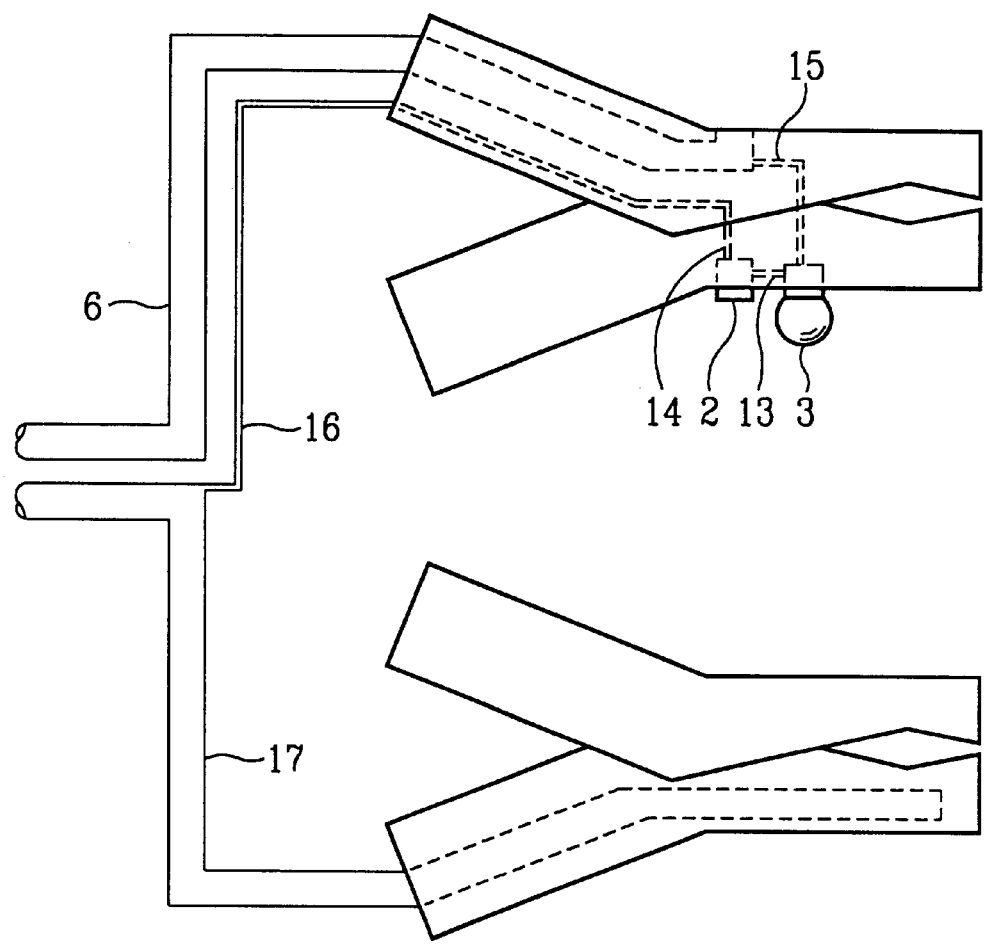
FIG. 4 is a diagram of the wiring of the jumper cable of an alternative embodiment of the present invention.

FIG. 4 represents an alternate embodiment of the present invention. In this arrangement, connection 13 establishes contact between switch 2 and light 3 an in the preferred embodiment. However, in the alternate embodiment, the voltage source is provided from the booster battery. Electrical connection 15 is established between the light 3 and the cable 6. An electrical connection is also established between the switch 2 and the cable 17 of opposite polarity. An auxiliary cable 16 and connection 14 establish the electrical connection between the cable of opposite polarity 17 and switch 2. When the switch 2 is activated, the booster voltage source activates light 3 independent of a connection to the battery to be charged. Preferably, cables 6 and 17 are connected to a portable booster device. However, cables 6 and 17 may also be connected to a conventional jumper cable connector for establishing a connection with another working battery in the traditional manner. In either circumstance, light 3 may be selectively illuminated both prior to and after connection is established with a battery to be charged.

While the foregoing invention has been shown and described with reference to a preferred embodiment, it will be understood by those possessing skill in the art that various changes and modifications may be made without departing from the spirit and scope of the invention.

We claim:

1. A battery jumper cable for providing a connection between a booster battery and a lesser charged battery, said battery jumper cable comprising:

two insulated cables having first and second ends;

a battery attachment means disposed at said first ends of said two cables for establishing electrical contact between said two cables and a corresponding battery terminal; wherein one of said battery attachment means further comprises;

a independent voltage source;

a switch; and a light device, whereby activation of said switch closes a circuit between said independent voltage source and said light thereby selectively providing illumination to an area adjacent said one battery attachment means.

2. The battery jumper cable according to claim 1, wherein, said switch is comprised of a pushbutton switch operable between on and off positions and spring biased in said off position.

3. The battery jumper cable according to claim 1, wherein said one of said battery attachment means further comprises:

electrically insulated pole pliers; said pole pliers including a compartment for containing said voltage source between and electrically connected to a pair of leads, said switch being electrically connected to one of said leads and said light, said light being in turn electrically connected the other of said leads.

4. The battery jumper cable according to claim 3, wherein, said light comprises an LED.

5. A battery jumper cable for providing a connection between a booster voltage source and a lesser charged battery, said battery jumper cable comprising:

two insulated cables having first and second ends each having a pole plier secured thereto for establishing electrical contact to a corresponding terminal of one of said lesser charged battery and said booster voltage source to provide an electrical connection between said booster voltage source and said lesser charged battery wherein one of said pole pliers connected to a first one of said insulated cables comprises;

a switch;

a light device, and an auxiliary electrical connection between one of said switch and light device and a second one of said two insulated cables, whereby activation of said switch closes a circuit between said booster voltage source and said light independent of said connection between said booster voltage source and said lesser charged battery thereby selectively providing illumination to an area adjacent said one of said pole pliers, said switch and light device being integrally formed with said one of said pole pliers.

6. The battery jumper cable according to claim 5, wherein said auxiliary electrical connection includes an auxiliary cable extending from said second insulated cable within and through an end portion of said one of said pole pliers and connected to one of said switch and said light device.

\* \* \* \* \*